United States Patent
Orava et al.

(10) Patent No.: US 7,174,389 B2
(45) Date of Patent: Feb. 6, 2007

(54) TANDEM NODE SYSTEM AND A METHOD THEREFOR

(75) Inventors: Fredrik Orava, Sigtuna (SE); Lars Ramfelt, Palo Alto, CA (US)

(73) Assignee: Metro Packet Systems, Inc., Palo Alto, CA (US)

( * ) Notice: Subject to any disclaimer, the term of this patent is extended or adjusted under 35 U.S.C. 154(b) by 22 days.

(21) Appl. No.: 10/818,807

(22) Filed: Apr. 6, 2004

(65) Prior Publication Data

US 2005/0165960 A1   Jul. 28, 2005

Related U.S. Application Data

(63) Continuation of application No. 10/707,916, filed on Jan. 23, 2004.

(51) Int. Cl.
*G06F 15/173* (2006.01)
*G06F 11/00* (2006.01)
*G11B 17/30* (2006.01)

(52) U.S. Cl. .......................... 709/239; 370/216; 714/4
(58) Field of Classification Search ................ 370/216, 370/401; 714/4; 709/239
See application file for complete search history.

(56) References Cited

U.S. PATENT DOCUMENTS

| | | | |
|---|---|---|---|
| 6,556,547 B1 * | 4/2003 | Srikanth et al. ............ 370/317 |
| 2001/0017723 A1 * | 8/2001 | Chang et al. ............... 359/128 |
| 2001/0048661 A1 * | 12/2001 | Clear et al. ................. 370/218 |
| 2002/0186653 A1 * | 12/2002 | Jensen ........................ 370/219 |
| 2004/0153704 A1 * | 8/2004 | Bragulla et al. ............... 714/4 |
| 2004/0153866 A1 * | 8/2004 | Guimbellot et al. .......... 714/47 |
| 2004/0264364 A1 * | 12/2004 | Sato ........................... 370/217 |
| 2005/0007951 A1 * | 1/2005 | Lapuh et al. ............... 370/225 |
| 2005/0117598 A1 * | 6/2005 | Iijima et al. ................ 370/412 |
| 2005/0169284 A1 * | 8/2005 | Natarajan ................... 370/401 |
| 2005/0201272 A1 * | 9/2005 | Wang et al. ................ 370/216 |

* cited by examiner

*Primary Examiner*—Rupal Dharia
*Assistant Examiner*—Chirag R Patel
(74) *Attorney, Agent, or Firm*—Rolf Fasth; Fasth Law Offices

(57) ABSTRACT

The tandem node system has a first node having an access link connected to a first port group of a first customer and a first network link connected to a first router. A second node has an access link connected to the first port group of the first customer and a first network link connected to a second router. The first node has a second network link connected to a second network link of the second router.

12 Claims, 4 Drawing Sheets

TANDEM NODE SYSTEM AND A METHOD THEREFOR

PRIOR APPLICATION

This is a continuation patent application of U.S. patent application Ser. No. 10/707,916, filed 23 Jan. 2004.

TECHNICAL FIELD

The present invention relates to a tandem node system and a method of sending information through the tandem node system.

BACKGROUND AND SUMMARY OF INVENTION

The logical topology of the infrastructures built of Marlin node units is always hub and spoke. All traffic is back-hauled to the hub and there is no possibility of traffic passing between two access interfaces without passing the router or switch that constitutes the hub. The prior art infra-structure 10 in FIG. 1 shows routers 12, 14 connected to an access network 16 that are associated with customers C1–C6 that may be companies that in turn are connected to internal networks. The network 16 may be a metro access system that has a plurality of Ethernet switches that are suitable for VLAN structures. Operators often use VLAN technology and extra functionality in the switches to prevent any direct communication between customers although the Ethernet switches permit such communication. In this way, the operators can measure the traffic and charge the customer accordingly and furthermore the operator can protect the customers from one another. Each trunk link 18, 20 connecting to the hub node may carry the traffic from several customers attached to leaf-access ports in the system. Individual leaf-access ports are represented by a distinct tag that is associated with a router sub-interface or VLAN table entry in the hub node.

Ethernet switches forwards packets based on the destination address. Ethernet switches are intended for friendly enterprise environments and include a number of automatic features in order to ease the installation and operation of the network. However, these automatic features become problematic in large scale operator environments. The automatic features do not scale to large infrastructures and needs sometimes to be disengaged to increase security. This requires manual configuration of possibly a large number of individual units. One specific example of an automatic feature of Ethernet switches is that they dynamically learn each unique source address of the packets received in order to optimize the forwarding of traffic. It is sometimes necessary to disengage this learning process to prevent customers from being able to communicate directly with each other without going through a service provider. In summary, problems with basic Ethernet switches include: no support for customer separation; low degree of security due to the fact that cross traffic directly between end-customers is allowed; dynamic address learning may open up for DoS attacks; requires distributed element management and service creation due to the fact that a potential large set of distributed units needs to be configured and managed; and the standard based Spanning Tree Protocol (STP) based restoration is slow.

The system of the present invention provides a solution to the above-outlined problems. More particularly, the tandem node system of the present invention has a first node having an access link connected to a first port group of a first customer and a first network link connected to a first router. A second node has an access link connected to the first port group of the first customer and a first network link connected to a second router. The first node has a second network link connected to the second node. Each node prevents direct communication between two separate access ports. Preferably, the first node is in an active status and forwards traffic from the access port while the second node is an inactive stand-by status and discards traffic coming in on the access port.

DETAILED DESCRIPTION

Figure 1:
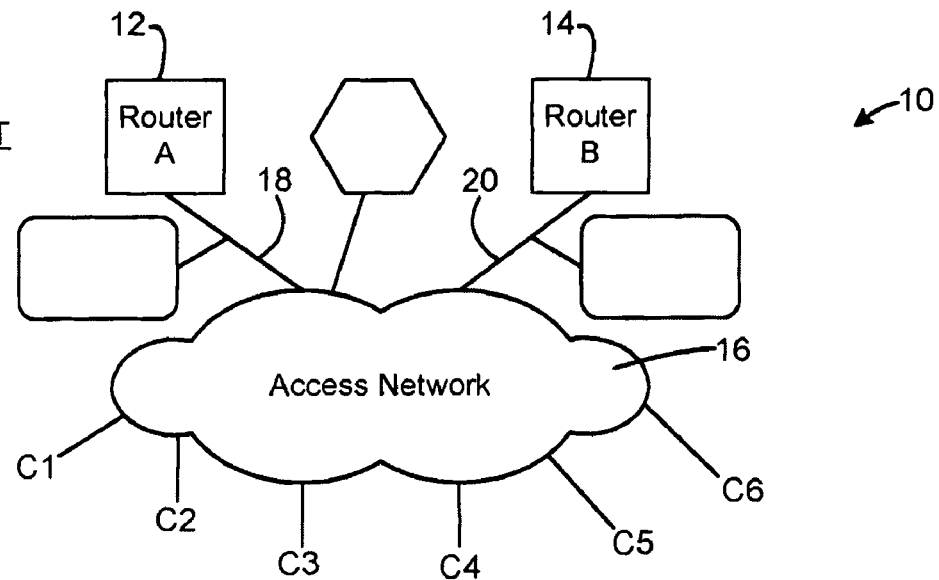
FIG. 1 is a schematic illustration of a prior art access network with VLAN customer separation.
Figure 2:
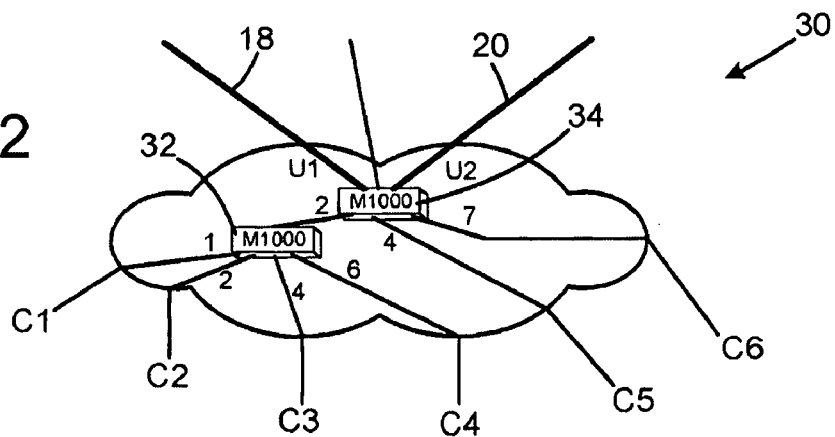
FIG. 2 is a schematic illustration of Marlin units in an access network.

As shown in FIG. 2, the physical topology 30 may be different than the logical hub and spoke. First, a tree structure may be used to aggregate the customer traffic in several steps towards the hub node. A daisy-chain of Marvin multiplex units 32, 34 can be used to simplify the build out when a tree is unsuitable or to reduce the amount of fiber or copper links as well as the number of router or switch interfaces. The units 32, 34 can be used to connect and merge a plurality of customer lines while keeping each customer line separate with tags so the lines are not mixed up. For example, each unit may have ten access ports and two network ports. The units 32, 34 may have the characteristics of receiving and sending Ethernet frames and the units only switch information between the access ports and the network ports and vice versa but not between different access ports and between different network ports. The tags are used to distinguish the traffic from and to the customers so that a virtual interface in the hub node may be set up for each customer.

Preferably, the tags are of a type that is currently used by many routers and switches to make the implementation easy.

When untagged traffic is coming from a customer the Marvin units add the tags before the traffic is sent to an upstream Marvin unit or to the hub node, the tag makes sure that the traffic is sent to the correct virtual interface where the tag may eventually be removed. The hub node will in this way also know from which access port the traffic was sent. The hub node may in turn be connected to an IP network or any other suitable network.

Many different access network service architectures may be used. The architectures may be based on the number of redundant connections to the metro core network and to the customer site. Single and dual connections provide four possible combinations including a single network that has a single customer connected thereto. In a single-network-single-customer architecture, the access network is attached to the metro core via one connection and the customer is connected to the access subsystem via one connection. All traffic transmitted from the network core via the access system is delivered without duplication to the customer and vice versa. All redundancy and restoration mechanisms are hidden within the access subsystem. It is impossible in this architecture to protect the attachment links or attachment nodes.

Another situation is a dual-network with a single customer attached thereto. The access network is attached to the metro core via two independent connections and the customer is connected to the access subsystem via one connection. In this way, two hub nodes, such as routers or switches, may be connected to the access network so that one hub node may be the back-up for the other in case the hub node malfunctions. All traffic transmitted from the network core via any of the two metro core attachment links are forwarded to the customer. Traffic from the customer is forwarded to both of the two metro core access links if the provider edge equipment is capable of filtering the information in order to avoid duplication such as IP routers. In other environments, such as switched Ethernet, ingress traffic is only sent via one of the two metro core access links. This additional filtering is provided by the Marlin node attaching to the metro core. It is possible in this architecture to protect the attachment links or attachment nodes, but it requires additional functionality in the metro core system or in the customer system. The requirements may be fulfilled by specific redundancy mechanisms such as VRRP, HSRP or generic dynamic routing protocols such as OSPF. VRRP and HSRP only effects the metro core system, OSPF requires also the customer to participate in the protection procedure.

Another classification is a single network with dual customer attached thereto. The access network is attached to the metro core via one connection and the customer is connected to the access subsystem via dual connections. All traffic transmitted from the network core via the access system is delivered without duplication to either of the customer connections. Two modes of this system are possible either the customer delivers one copy of each frame to both of the attachment connection or the customer delivers a single copy to one of the attachment connections. In both cases the access network guarantees to deliver the traffic without duplication. If the customer choose to send traffic to only one of the access links it requires the customer to interact either with the access system itself or the metro core system to accomplish restoration in case of failures.

The last classification includes a dual network with a dual customer attached thereto. The access network is attached to the metro core via dual connections and the customer is also connected to the access subsystem via dual connections. This is a combination of the examples outlined above.

A basic requirement for all types of restoration mechanisms is the presence of redundant resources. One common model is to use one specific resource as primary and protect it by a back-up or stand-by resource of the same type. One resource can be the back-up for a number of primary resources. The types of resources that can be duplicated in access systems built with Marlin units are communication links and Marlin nodes. The communication link includes optical as well as electrical ones. To provide a high degree of redundancy, the duplicated links should be located in different cables in order to achieve physically different communication paths. Nodes, such as Marlin units, can be duplicated in order to protect against nodes failures and to provide a mechanism to perform up-grades and maintenance on these without disturbing the service delivery.

As described in detail below, with node and link redundancy the system can be protected against failures within the access network. To protect against failures of the attachment links to, and the attachment units of, the core network, the attachment point, such as a router or switch, should to be duplicated. If the core network is an IP network, router duplication provides possibilities of protecting against router failures as well as failures of the attachment links to the access network. Router duplication also provides the possibility of performing maintenance and upgrades without disturbing the service delivery. Restoration in case of router failures can be provided either by manually switching from a failed router to a back-up router, or automatically switch by using dynamic routing protocols such as OSPF, or other mechanisms such as VRRP/HSRP. How the restoration mechanisms are supported in Marlin access networks is explained in detail below. If the core network is a pure layer 2 switched Ethernet, redundant attachment nodes, such as Ethernet switches, may provide the same type of protection as do the redundant routers above. In a layer 2 Ethernet system, the switch over from a failed primary switch to a back-up secondary switch may be performed automatically within the core layer 2 network. However, this places some extra requirements on the Marlin access network.

A Marlin access network may also be used to connect a customer site via dual redundant attachment links. In these cases the customer premise equipment (CPE) may need to fulfill certain requirements in order to hide the dual links from the customer and to have a simple and well defined interface between the CPE and the customer equipment including single, full duplex and Ethernet connection. Thus, the CPE may need to map between the dual redundant attachment links and the single customer link. The CPE should be able to receive traffic from any of its network ports and to transmit all data via both of them. These requirements may be fulfilled both by the M1000 units and other units such as the FSP150CP units.

In order to recover from failures of the resources, including links and nodes in an access network, three mechanisms should be in place including failure detection, protection policy and restoration mechanisms. Failure detection may be achieved by monitoring the resources, for example, by monitoring the number of CRC errors on a link, or by using a watchdog timer to monitor that a particular node is alive. It may be assumed that such mechanisms are in place and that a Marlin node can issue an event message that may be sent via both of the network ports on detection of a failure of a node or a link.

The protection policy may provide decisions on what actions should be taken when a particular failure occurs. In order to make such decisions, knowledge about the physical topology of the access network is required. Finally, the restoration mechanism is an implementation of the decision taken based on the policy.

The policy and restoration can be implemented in a Marlin access network in many different ways. Solutions may be partitioned into two categories including restoration by manual reconfiguration and automatic restoration by using tandem nodes.

It is possible to do the restoration by manual reconfiguration. When using this method the Marlin access system detects link and node failures, propagates information about these to a unit with topology knowledge that in turn propagates information about the failure, and possibly also proposed actions, to a central network management system where an operator is required to take some action in order to restore the service.

As an example, a Marlin access network may be connected to two routers that do not run any dynamic routing protocol or VRRP/HSRP so that there is no communication between the routers. It could be assumed that for a particular leaf access port, such as the port (p), one of the routers, such as the router A, is the primary router and the other router, such as the router B, is secondary router. The primary router forwards traffic to and from port (p) and the rest of the core network has routes to port (p) via router A. If a failure occurs in the access network disabling the communication path from router A to the port (p), a message, such as a SNMP trap, containing information about the failure may be sent to a central network management system. An operator may then manually switch router B from the secondary state to the primary state for port (p) and thus restoring the service. The switch from the secondary to the primary state may include configuring a virtual interface of the router B corresponding to the port (p) from stand-by to operational mode thus enabling the router B to forward traffic to and from that interface and furthermore also announcing a reachability to any subnet attached to the virtual interface to the router neighbors of router B and via this action move the forwarding of traffic to the port (p) from router A to router B.

Figure 3:
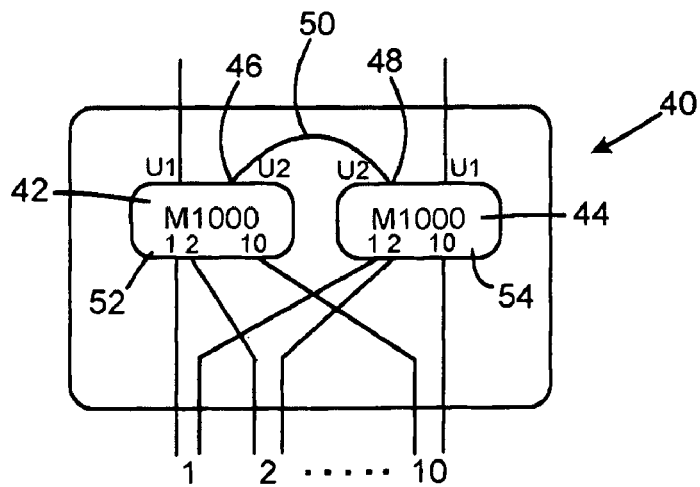
FIG. 3 is a schematic illustration of two Marlin units connected in a tandem mode.

As best shown in FIG. 3, two Marlin units 42, 44 of a system 40 may be connected in tandem to provide redundancy. When connected in tandem the U2 network ports 46, 48 of the two Marlin units or nodes 42, 44 are connected together via a U2 link 50 and the access ports 52, 54 are grouped in pairs such that access ports (i) including (i)=52/54(1); 52/54(2) : : : ; 52/54(10), of the two units 42, 44 belong to the same group. The index of the port group may the same as the index of the ports. The behavior of the tandem nodes 42, 44 on a per port basis is described below. Ingress traffic from a customer C may be forwarded to both the U1 and U2 links to provide redundancy. If the tandem node is connected to an IP network via one or several IP routers, the routers ensures that the same message is not sent twice to the IP network. If the tandem node is connected to a switched Ethernet via one or several Ethernet switches, it is the responsibility of the tandem node to assure that no duplicated messages are sent into the attachment switches.

The egress traffic of the tandem node 42 may, for example, be received via the network port links U1 of the tandem node 42, such as the U1 network ports of one of the constituent Marlin nodes, and is forwarded to one of the access ports of a port group determined by the tag of the received traffic. If traffic is simultaneously received via the other network port of the tandem node, that is, the port U1 of the other constituent Marlin node and is tagged with the same value, that traffic is forwarded to one of the access ports in the same port group, so it does not matter if the tagged traffic comes via one or the other network ports of the tandem node. The routing of traffic within the tandem nodes 42, 44 depend on the tag in same manner as in an individual Marlin node so that frames that are tagged with 0xXX3 is forwarded to one of the ports in port group 3.

The ingress traffic received via one of the access ports 52, 54 in a port group is forwarded to both of the network ports U1 of the tandem nodes 42, 44. The ingress traffic received via the other ports in the group is preferably dropped.

Thus, the behavior of a tandem mode may be the same as the behavior of a normal Marlin node if the port groups are considered as abstract ports so that the identity of the individual ports within a port group is disregarded.

Figure 4:
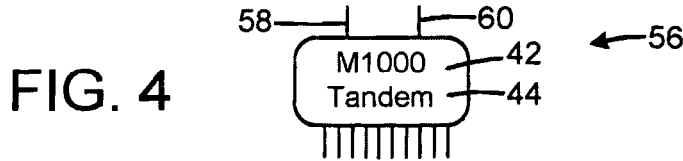
FIG. 4 is a schematic illustration of a tandem node abstraction.

As best shown in FIG. 4, internally the tandem node 56 may consist of two Marlin units 42, 44 with connected U2 ports and two U1 ports 58, 60. Port group (i) of the tandem node 56 may consist of access port (i) of the two constituent units 42, 44. Each of the two Marlin units 42, 44 operates in a tandem mode. When in the tandem mode, a Marlin unit can be in one of two tandem states on a per access port basis including active and stand-by states. The state of the Marlin unit relative to a first access port may be active while the Marlin unit may be in a stand-by state relative to a second access port. In other words, the state of the Marlin units is in relation to the access ports. When the Marlin unit is in the active state, relative to the access port (p), the Marlin unit operates exactly in the same manner as an ordinary Marlin unit i.e. it forwards data tagged with 0xp received from any of its network ports to port (p) and forwards all ingress traffic received via access port (p) to both of its network ports 58, 60. When in the stand-by state, relative to the access port (p), the Marlin unit by-passes all traffic tagged with 0xXXp received via U1 ports 58 or 60 unmodified to U2 egress traffic and vice versa for ingress traffic. Furthermore, ingress traffic received via access port (p) is dropped.

A Marlin unit operating in tandem mode may also operate on a per access port and tag basis. In this case, the state relative a first access port and a first tag (p,t) may be active while the state of the Marlin unit may be stand-by relative a second access port and a second tag (p',t') where either p=p' or t=t' may hold. When the Marlin unit is in the active state, relative to the access port (p) and the tag (t), the Marlin unit operates exactly in the same manner as an ordinary Marlin unit, such as when it forwards data tagged with 0xpt, received from any of its network ports to port p and modifies the tag to read 0xt, and forwards all ingress traffic received via access port p tagged with 0xt to both of its network ports 258, 260 and modifies the tag to read 0xpt. When in the stand-by state, relative to the access port (p) and tag (t), the Marlin unit by-passes all traffic tagged with 0xpt received via U1 ports 258 or 260 unmodified to U2 for egress traffic and vice versa for ingress traffic. Furthermore, ingress traffic received via access port (p) tagged with 0xt is dropped.

In this way, the tandem node provides a high degree of redundancy because the network ports are duplicated, as is the case in any Marlin unit, the node itself is duplicated, and the access ports are duplicated. A protected access network may be constructed by connecting units (U) with dual network ports to the tandem nodes such that both network ports of the unit (U) are connected to the two ports of the same port group of the tandem node. Any system can be connected to the access side of a tandem node and be protected as long as it accepts data from both network ports and transmits all data received from the access ports to both network ports. Two systems that may support the concept without modification are the Marlin units themselves and the ADVA units such as FSP150CP units. It should be noted that a complete sub-tree built from Marlin or tandem units can be connected to a port group. It should also be observed that an unprotected chain built from Marlin units fulfills the above requirements and can thus be connected to a port group.

To protect against access link failures, and failures of nodes within in the tandem node itself the restoration mechanism used is to switch the tandem states of the constituent Marlin units from active to stand-by and stand-by to active. A Marlin access network built with tandem modes provides protection against failures of links and nodes internal to the access network and failures of Marlin units constituting parts of tandem nodes.

The restoration mechanisms of the tandem node may be exactly the same if a tree or a chain is connected to a port group. It should be noted that the tandem nodes do not per se provide protection against failures of links used to connect the access network to the metro core, nor do they provide protection against router failures. However, the tandem node may work in concert with other redundancy mechanisms, such as VRRP, HSRP and dynamic routing protocols such as OSPF, to provide protection against these types of failures, as discussed below.

Figure 5:
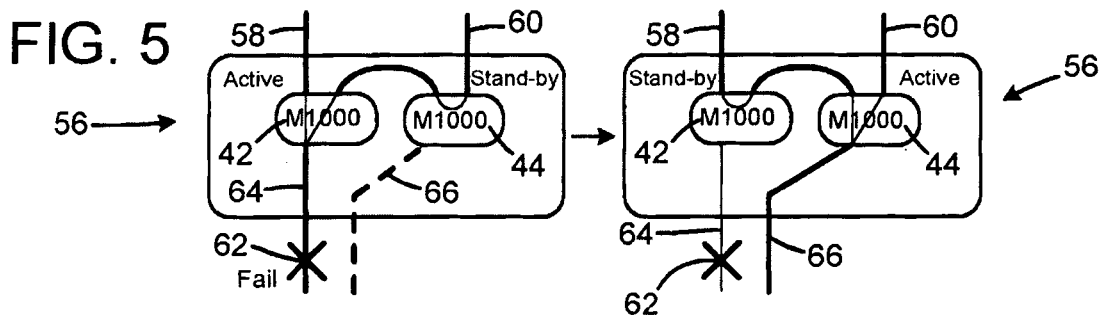
FIG. 5 is a schematic illustration of a restoration of an internal link failure.

As best shown in FIG. 5, the tandem node 56 has a link internal to the Marlin access network when the link is located below the tandem node 56 or a normal Marlin node. The Marlin unit 42 of the tandem node 56 is in active state and the Marlin unit 44 is in the stand-by state relative to the access port group (p) as indicated by the links 64, 66. In general, the port group (p) consists of two ports, ($p_l$) of Marlin unit ($M_l$) and the port ($p_r$) of the Marlin unit ($M_r$). If the link connected to $p_l$ of port group p fails an event will be generated notifying both Marlin unit $M_l$ and the Marlin unit $M_r$ about the failure. Upon reception of this event $M_l$ will change state relative the port group p from active to stand-by and the Marlin unit $M_r$ will change state relative to the group p from stand-by to the active state. After these changes the operation of the tandem node 56 relative port group p is restored so that the operation before the failure and after the restoration is the same.

More particularly, a failure 62 may occur on the link 64. The node 42 switches from the active mode to a stand-by status since no traffic is received on the link 64. The node 44 may be switched from the stand-by mode to the active mode since no information is received in the tandem link 70. The node 44 may also be set up to compare the incoming traffic in the link 66 with the incoming traffic in the tandem link 70. If there is a great discrepancy, node 44 may conclude that there is a link failure or that node 42 is malfunctioning. The failure 62 of the link 64 may also be discovered by node 42 that sends an alert message into link 58 and via tandem link 70 to the node 44 to inform that the node 42 switches to the stand-by mode. Upon receipt of this alert signal the node 44 switches to the active mode.

Because the node 44 is in the active mode, the node 44 accepts information sent in the link 66 and forwards this information into the link 60. The node 44 also forwards information into the tandem link 70 that is received by the node 42 and forwarded into the link 58. The information flow in the node is thus reversed and the information is forwarded in both the links 58, 60.

Figure 6:
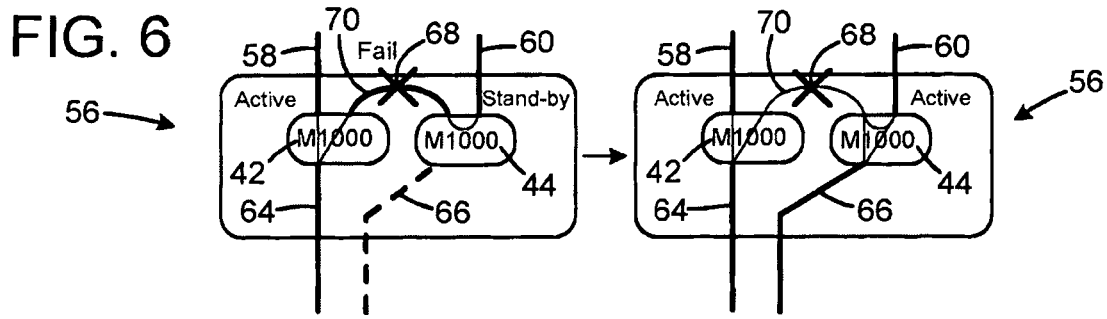
FIG. 6 is a schematic illustration of a restoration of a tandem link failure.

FIG. 6 is a schematic illustration of a restoration of a tandem link failure 68 on the tandem link 70 extending between the Marlin units 42, 44. The left part of FIG. 6 depicts the normal situation with the Marlin unit 42 in the active state, relative to the port group p, and the right Marlin unit 44 is in the stand-by state. If the tandem link 68 connecting the Marlin units fails both units 42, 44 may be notified either via a direct detection mechanisms such as link-down or via an indirect mechanism based on communication or lack of communication between the nodes 42, 44 in the tandem node. The nodes 42, 44 may regularly exchange status information over the link 70 SO that the stand-by node may be notified when the link 70 fails or when the active node fails so that the stand-by node switches to the active status. Upon receipt of the notification of the tandem link failure 68 both Marlin units 42, 44 preferably enter active state relative to all port groups and both links 64, 66 are active to carry traffic so that traffic is forwarded through both links 58, 60. After this state change the operation of the tandem node 56 is the same as before the tandem link failure so that traffic flows in the links 58, 60 into the connecting routers.

Figure 7:
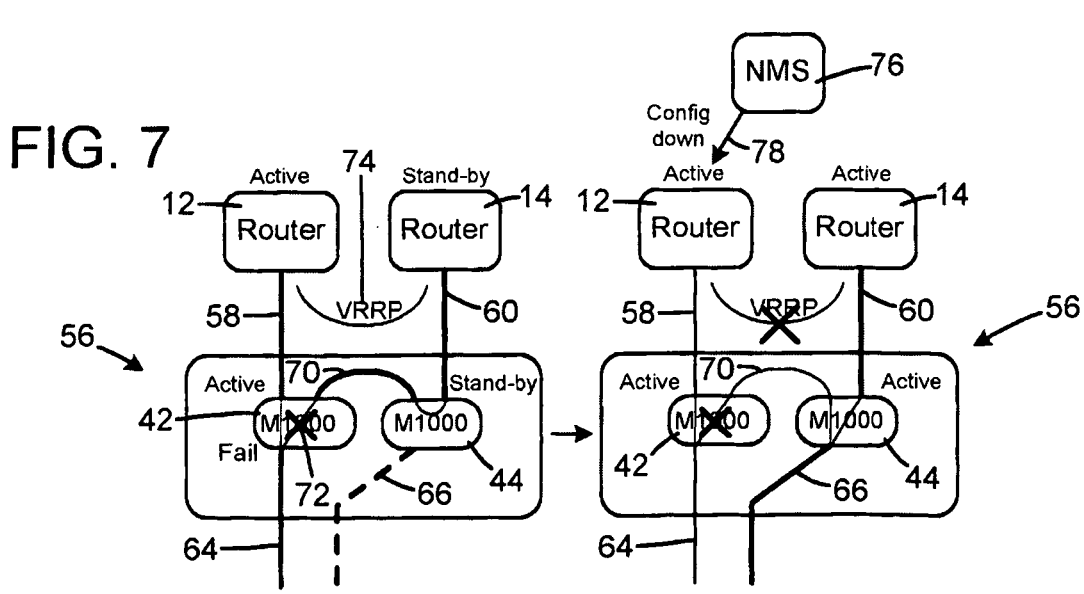
FIG. 7 is a schematic illustration of a restoration of a node failure.

FIG. 7 shows an example of a restoration of a node failure 72. Node failures that are internal in the Marlin access network, that is the failure is not directly below a router, may be treated the same way as internal link failures. Node failures of tandem nodes connected directly to the core network or router may require some extra explanation because a link to the router is completely lost. For example, the node 42 of the tandem node 56 may experience a node failure 72. The node 42 is directly connected to the router 12 and there is no node between the failure 72 and the router 12. The node 44 detects the failure 72 either via a link down signal or via absence of communication via link 70 from node 42 and changes the stand-by state to enter the active state relative to all port groups. After this state change the operation of the tandem node 56 may be restored with the exception that ingress traffic sent via the leftmost link 64 will not reach its destination, and no traffic can be received via the network link 58 to the router 12. Traffic will flow in the link 66 via Marlin unit 44 and link 60 to and from the router 14. This situation, where the Marlin access network is left with only one working attachment point, may be inevitable as it is the unit attached to the core network that has failed. In order to protect the service against these kinds of failures the access network may be connected to the core network via duplicated routers and if the restoration of the service should be automatic, the routers need to run some kind of dynamic routing protocol, such as OSPF, or some other kind of generic protection software such as VRRP or HSRP 74 so that the routers 12, 14 may communicate via the U2 link 70 and the links 58, 60. When the node 42 fails, no VRRP information sent by the router 12 may reach the router 14 via the link 70 and link 60 because the VRRP information does not pass the failed node 42.

Assume that the Marlin access network in FIG. 7 is connected to the core network using two routers 12, 14 running VRRP/HSRP. The router 12 attached to the unit 42 is in the active state while the router 14 attached to the unit 44 in the stand-by state.

When the node 42 fails in such a way that the router 12 becomes aware of the fact that either the attachment link 58 or the node 42 has failed such as via a link down signal on the router interface. The router 12 may then remove the affected interface and all its sub interfaces from its routing table and stop announcing reachability of the attached sub networks to the rest of the core network. The router 12 may then exit the active state. The router 14 may then detect the failure via the absence of messages from router 12 and enter the active state. In this state the router 14 may start announcing reachability to all sub networks connected via the Marlin access network, and starts forwarding ingress traffic received via the link connected to the tandem node 56.

When the node 42 fails in such a way that the router 12 does not directly become aware of the failure such as when the links are still active but the Marlin node 42 is not forwarding traffic, the tandem protection mechanism may detect the failure such as via the absence of communication from the node 42 and restore the operation as described above.

Furthermore, the VRRP/HSRP protocol may cause the router 14 to switch from a back-up state to the active state. The problem at hand is that it may be the case that the router 12 does not become aware of the local node failure and wrongly concludes, due to missing VRRP/HSRP traffic that the back-up router 14 has failed. Thus, the router 12 may remain in the active state. The back-up router 14 may then switch from the back-up state to the active state as it does not receive any traffic from router 12. The information flow is now as in the rightmost part of FIG. 7 where both routers 12, 14 are in the active state and are both announcing reachability to the connected sub networks. However, only the router 14 can receive and transmit traffic to and from the sub networks. All ingress traffic received by the router 12 via the customer ports will be forwarded to the metro core network, but some of the traffic destined to customer sites may be sent to the router 12 which will not be able to deliver it to the intended destination. In other words, to have the router 12 in the active state is not a problem when the node 42 has completely failed and sends no information in the link 58. The problem occurs when the node 42 has partially failed so that it sends some information in the link 58 to the router 12 that forwards the information to the desired destination. Another problem is that the router 12 will announce to the rest of the network that it is active and may therefore receive traffic to be forwarded down to the customers although the customers cannot be reached from the router 12 due to the failure of node 42.

This problem is a general one and basically depends on the absence of a link protocol for Ethernet links, that is, an Ethernet port can be in operational state "up" but the layer two communication paths can still be broken. This may be resolved by generating a notification such as an SNMP trap, to the network management operation center 76 where the operator can configure the router 12 to a non-active state by sending a configure-down signal 78 and by this action remedy the problem. It may also be possible for the nodes 42, 44 to be designed so that it sends regular status signals to the routers 12, 14, respectively, so that the routers become aware when or if one of the directly connected nodes fails. It may also be possible for the fully functioning node 44 to send an alert message to the management center 76 via router 14 when node 42 has failed since node 44 will become aware of this failure due to lack of status communication received via the link 70.

During network link failures, such as failures on the links 58, 60, when a network link connecting the tandem node 56 to the core network fails no action is taken by the tandem node 56. A failure in one of the network links 58, 60 is equivalent to a failure of an upper node 42, 44 that is directly connected to the routers 12, 14. Restoration may be accomplished via a router redundancy mechanism such as VRRP/HSRP, or by using dynamic routing protocols such as OSPF. The problem with detecting link failures discussed above is present also in this scenario. The tandem node may issue event notification messages to the network operation center in order to ease the recovery.

During router failures, a Marlin access network may provide support for router redundancy by providing the dual network links 58, 60. Control traffic for VRRP/HSRP is forwarded between the dual network links. No specific action is taken by the Marlin system upon router failures.

The time it takes for the tandem node 56 to restore customer service after a failure depends mainly on the time necessary to detect link or unit failures, the time needed to propagate failure notification to the two Marlin units 42, 44 in the tandem node 56, and time needed to switch the per port state from passive to active on the backup side. If an efficient method to detect link failure is present it is possible to recover service for customers within 50 ms.

At least three basic topologies can be constructed with Marlin units including tree, chain, and point-to-point topologies. In a multi-level Marlin network many combinations are possible. All supported unprotected as well as protected topologies include the characteristics that the supported topologies have at most two uplinks, a protected topology is single rooted so that there is one Marlin or one Tandem node at the top, a tree topology is always single rooted, one Marlin or one Tandem node at the top, and in tree and ring topologies, leaf ports are associated with one single port-ID, regardless of redundancy.

The supported topologies, tree, chain and point-to-point, as described below. All these three different types of topologies can be constructed unprotected with no redundancy and protected with redundancy. A single Marlin is by definition a tree. A two level tree may be constructed by connecting the network ports of a Marlin unit to the access ports of another Marlin unit.

Figure 8:
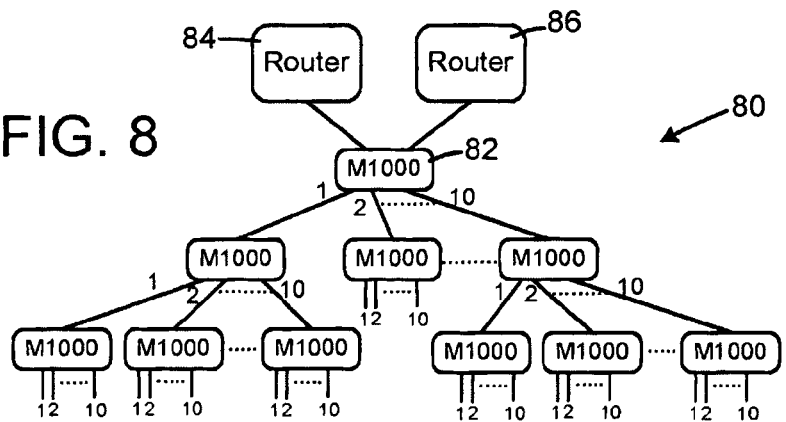
FIG. 8 is a schematic illustration of an unprotected tree topology.

As best shown in FIG. 8, it is possible to construct trees with up to three levels so that an unprotected tree topology 80 may be constructed. The top Marlin unit 82 is connected to the routers 84, 86. In this way, the number of customers that can be connected increases substantially.

Figure 9:
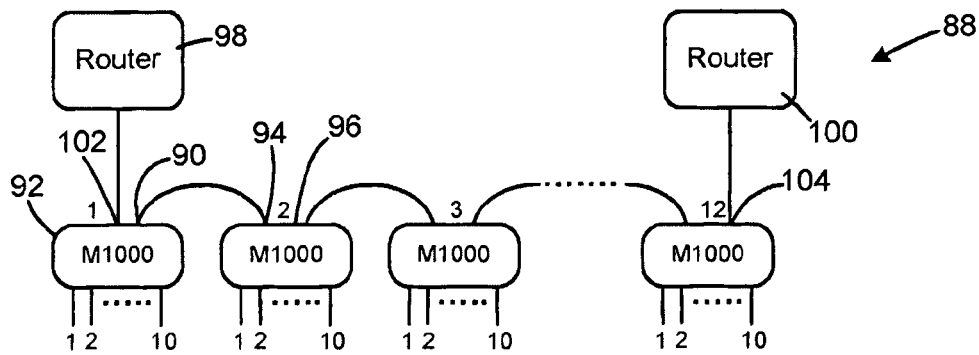
FIG. 9 is a schematic illustration of a redundant daisy-chain topology.

As best shown in FIG. 9, the Marlin units can be deployed in a daisy chain topology 88 where one network port 90 of a first Marlin unit 92 is connected to a network port 94 of another Marlin unit 96 and so on. A first portion of the tag may address the level of the Marlin unit while a second portion of the tag may address the port on the Marlin unit. In this way, a Marlin unit will forward the information as long as it is not the Marlin unit referred to in the first portion of the tag. When a Marlin unit receives information into one of the access port, the Marlin unit may add the first portion of the tag number for the Marlin unit and a second portion of the tag number for the port number or customer from which the information was sent. The Marlin unit will then forward the information in both up-links, as described above. Up to 12 units can be connected in a single chain. Of course, more or fewer units may be used as required. It is also possible to support router redundancy in a chain by connecting the same or two independent routers 98, 100 to the two end-points 102, 104 of the chain. If the chain breaks, the VRRP/HSRP signaling will not work reliably as the egress traffic to a chain node arriving to the router on the other wrong side of the break may be lost and the system may never recover. Some customers may still have service in this scenario.

This is a problem related to VRRP/HSRP and is in principle identical to the problem discussed above in relation to the tandem node. Other mechanisms, such as OSPF, may recover completely even after the chain breaks. VRRP/HSRP provides router redundancy and provides protection of the link connected directly to the router port but may not reliably recover from other failures.

Figure 10:
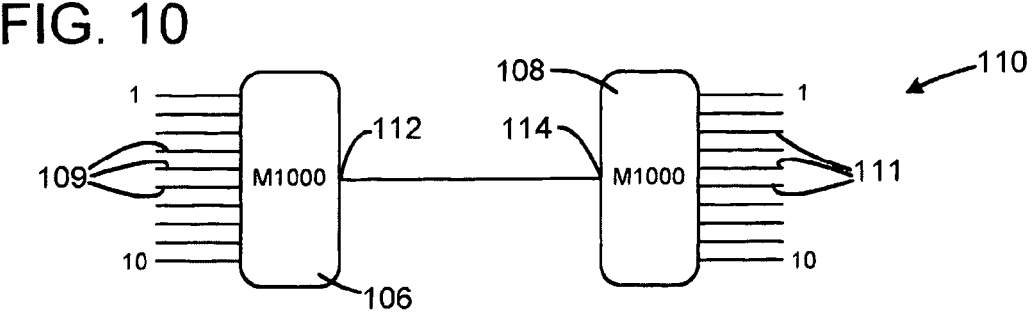
FIG. 10 is a schematic illustration of an unprotected point-to-point topology.

As best shown in FIG. 10, the Marlin units 106, 108 can be connected in a point-to-point topology 110 by connecting the network port 112 of the unit 106 to the network port 114 of the other unit 108. The customers 109 are connected to the unit 106 and the customers 111 are connected to the unit 108.

A protected tree topology may be constructed using Tandem nodes in the same manner as unprotected trees are constructed from Marlin units. A tandem node is a protected tree. A multi-level protected tree may be constructed by connecting both the network ports of a Marlin unit, or a tandem node, to the two ports of a port group of a tandem node.

The following requirement may be placed on protected trees. A tree is protected at level (i+1) only if it is also protected at level (i). This requirement implies that protected trees are built top-down starting from the root. For example, if the second level is constructed using Tandem nodes, then so is the first level. Examples of redundant tree topologies are given in the figures below.

Figure 11:
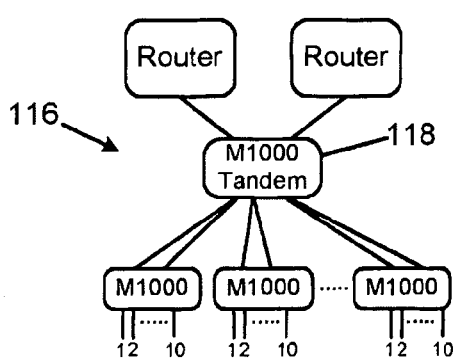
FIG. 11 is a schematic illustration of a redundant tree topology having a tandem node.
Figure 12:
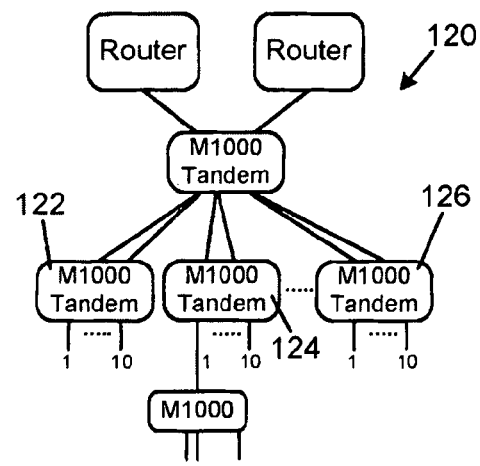
FIG. 12 is a schematic illustration of a redundant tree topology having a plurality of tandem nodes.

FIG. 11 shows a redundant tree topology 116 where the top level is constructed using a Tandem node 118. Preferably, each tree topology has only one top node that is directly connected to the routers. In FIG. 12 a tree topology 120 is shown wherein also the second level is built using redundant Tandem nodes 122, 124, 126. Router redundancy may be supported in protected trees in exactly the same way as in unprotected trees i.e. by connecting dual redundant routers to the dual uplinks of the protected tree.

Figure 13:
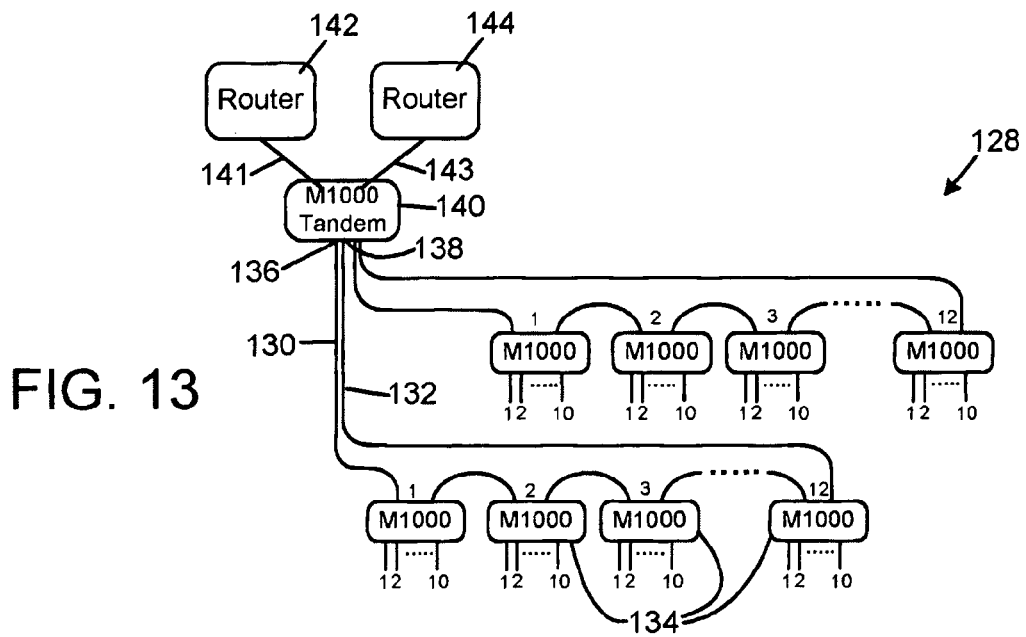
FIG. 13 is a schematic illustration of a redundant ring topology having a tandem node.

As best shown in FIG. 13, a protected chain topology 128 is constructed by connecting to the uplinks 130, 132 of an unprotected chain 134 to the two ports 136, 138 of a port group of a tandem node 140. Router redundancy may be provided by connecting two dual redundant routers 142, 144 to the two network ports of the Tandem node 140. Traffic that is received by the tandem node 118 will drop the information in one of the links 130, 132, depending upon which node is active or in the stand-by mode, and the tandem 118 sends the information in both up-links 141, 143. Traffic that is received by the tandem node 140 will be sent in either link 130 or link 132 to the chain 134, as explained above.

Figure 14:
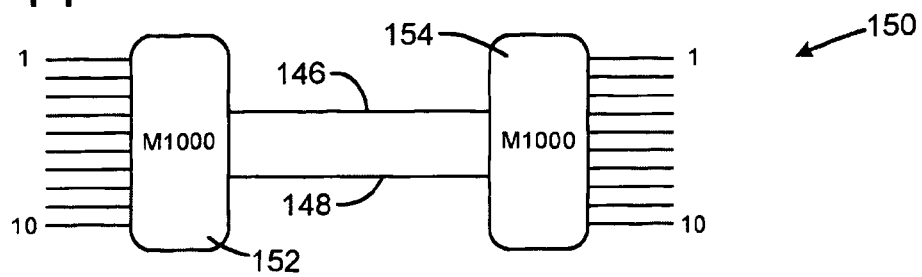
FIG. 14 is a schematic illustration of a redundant point-to-point topology.

If two trunk links 146, 148 are used in point-to-point configuration 150 data is always sent on both links, as shown in FIG. 14. It should be noted that there configuration 150 has no routers. For example, the unit 152 may send on both links 146, 148. On the receiver side, such as the unit 154, data is accepted from one of the links 146, 148. The units may automatically select one of the up-link ports from which to receive data. The units may automatically switch over to the other link on the receive side in case of failure on the active link.

The above described tandem node protection mechanisms may require communication between the nodes constituting the tandem node in order to synchronize the tandem state with respect to a port group and in order to switch to active/stand-by state in case of a failure. To remove this requirement of signaling between the nodes constituting a tandem node the scheme described below can be used such as in light-weight-tandem-operation (LWTO).

In LWTO both halves of a tandem node are initially in active state. In case of a failure of an access link connected to one of the halves, or of a link/node below one of the halves, the effected part of the tandem node directly switches to stand-by state without any signaling. The operation in active and stand-by state is slightly different from what is described above. LWTO also makes use of one bit in the tag of every frame sent over the tandem link.

In LWTO, the active state, relative to port group p, operates as follows: traffic received from an access port of a port group p is transmitted to the network port U1. Furthermore, the traffic is marked and sent to the network port U2. Traffic received from network port U1 and tagged with 0xXXp is transmitted to access port p. Unmarked traffic tagged with 0xXXp received from network port U2 is transmitted to access port p. Marked traffic tagged with 0xXXp received from network port U2 is dropped.

In LWTO, the stand-by state, relative to port group p, operates as follows: Traffic received from access port p is dropped. Traffic tagged with 0xXXp received from network port U1 is transmitted unmarked to network port U2. Marked traffic tagged with 0xXXp received from network port U2 is transmitted unmarked via network port U1. Unmarked traffic tagged with 0xXXp received from network port U2 is dropped.

With the above described behavior of the constituent parts, the operation of the tandem node is as follows. Initially both nodes constituting a tandem node is in active state. Traffic received from the access ports of a port group p is transmitted via the network ports of the tandem node such as the U1 links of the constituting nodes. Back-up traffic is transmitted marked via the tandem link and dropped at the receiving side. Traffic tagged with 0xXXp received via any of the network ports of the tandem node is transmitted to access port p of the port group by the constituting node receiving the traffic. If a failure occurs on one of the access links connecting to a port of port group p, the node to which the failed link connects switches to stand-by state relative port group p. In this configuration, including stand-by/active, traffic flows are as follows: The stand-by node receives marked traffic tagged with 0xXXp via the network port U2 and transmits it unmarked via network port U1. Traffic tagged with 0xXXp received from network port U1 is transmitted unmarked via network port U2. Traffic from access port p is dropped. The active part of the tandem node receives, via the tandem link, the unmarked traffic tagged with 0xXXp from the stand-by node and forwards it to access port p. It should be noted that with this mode of operation only the node that detects the failure changes behavior, thus there is no need for signaling between the constituting parts of the tandem node.

While the present invention has been described in accordance with preferred compositions and embodiments, it is to be understood that certain substitutions and alterations may be made thereto without departing from the spirit and scope of the following claims.

The invention claimed is:

1. A method of sending information in a tandem node system, comprising:
providing a first node having first access link connected to a first port group of a first customer and a first network link connected to a first router, a second node having second access link connected to the first port group of the first customer and a first network link connected to a second router and the first node having a second network link connected to a second network link of the second node;
the first and second nodes being switchable between active and stand-by modes;
setting the first node in the active mode relative to the first port group and in the stand-by mode relative to a second port group so that the first node is active relative to the first group port while being in a standby mode relative to the second port group, the first node having a third access link connected to the second port group, the second node having a fourth access link connected to the second port group, the first port group having no direct access to the second port group;
setting the second node in the stand-by mode relative to the first port group and in the active mode relative to the first port group so that the second node is stand-by relative to the first port group while being in an active mode relative to the second port group;

sending information from the first port group to the first node in the first access link;

the first node receiving the information from the first port group in the first access link and forwarding the same information in the first network link connected to the first router;

the first node marking the information;

the first node forwarding the marked information in the second network link connected to the second node;

the second node receiving the marked information from the first node in the second network link of the second node;

the second node un-marking the marked information;

the second node sending the un-marked information in the first network link connected to the second router;

sending information from the second port group in the third access link to the first node, the first node dropping the information from the second port group when the first node is in the stand-by mode relative to the second port group;

sending information tagged for the first port group to the first node in the first network link connected to the first router, the first node forwarding the information received in the first network link to the first port group in the first access link;

sending information tagged for the second port group to the first node in the first network link connected to the first router, the first node sending the tagged information received in the first network link to the second node via the second network link when the first node is in the stand-by mode relative to the second port group; and the second node receiving, in the second network link, the information, tagged for the second port group, the second node sending the information, tagged for the second port group, in the fourth access link to the second port group.

2. The method according to claim 1 wherein the method further comprises the second node disregarding information from the first customer when the second node is in a stand-by status and the second node receiving the information in the second network link from the first node when the second node is in the stand-by status.

3. The method according to claim 1 wherein the method further comprises setting the second node in a stand-by status and the second node ignoring information received in an access port of the second node.

4. The method according to claim 1 wherein the method further comprises setting the second node in a stand-by status relative to the first port group.

5. The method according to claim 1 wherein the method further comprises setting the first node in an active status and the second node in an active status.

6. The method according to claim 5 wherein the method further comprises identifying a failure associated with the first node and switching the first node from the active status to a stand-by status.

7. The method according to claim 1 wherein the method further comprises the first node only transmitting information, received in the access link, via the first network link and the second network link of the first node.

8. The method according to claim 7 wherein the method further comprises preventing information received in the access link from being transferred through another access link of the first node.

9. The method according to claim 1 wherein the method further comprises the second node receiving un-marked information in the second network link from the first node and the second node disregarding the un-marked information when the second node is in the stand-by status.

10. The method according to claim 1 wherein the method further comprises the second node receiving unmarked information in the second network link, the second node dropping the unmarked information received in the second network link.

11. The method according to claim 1 wherein the method further comprises the first node receiving un-marked information from the second network link, the first node forwarding the un-marked information to the first access link of the first node.

12. The method according to claim 1 wherein the method further comprises the second node receiving information in the first network link connected to the second router, the second node sending the information un-marked via the second network link to the first node when the second node is in the stand-by status.

* * * * *